3,014,934
6-CYANO ANDROSTANE DERIVATIVES
Albert Bowers and Howard J. Ringold, Mexico City, Mexico, assignors to Syntex S.A., Mexico City, Mexico, a corporation of Mexico
No Drawing. Filed Nov. 5, 1959, Ser. No. 850,994
Claims priority, application Mexico Nov. 6, 1958
20 Claims. (Cl. 260—397.4)

The present invention relates to certain new cyclopentanoperhydrophenanthrene derivatives.

More particularly, it relates to the novel 6-cyano androstane derivatives, and especially to 6α-cyano-testosterone, 6α-cyano-1-dehydro-testosterone, 6-cyano-6-dehydro-testosterone, and 6-cyano-1,6-bis-dehydro-testosterone, which may further have in their molecules substituents such as 11β-hydroxyl, 11-keto, 9α-fluoro-11β-hydroxy, 9α-fluoro-11-keto, as well as to the 17α-alkyl, alkenyl, and alkinyl derivatives of all of the aforesaid compounds.

Our invention also comprises the novel 6-cyano-derivatives of 19-nor-androstane, and more specifically 6α-cyano-19-nor-testosterone and its 17α-alkyl, alkenyl, and alkinyl derivatives, 6α-cyano-11β-hydroxy-19-nor-testosterone, 6α-cyano-11-keto-19-nor-testosterone, 6α-cyano-11-keto-17α-methyl-19-nor-testosterone. Finally it also comprises the 17-esters of all of the aforesaid compounds according to our invention.

Among such compounds, those unsubstituted or having an alkyl group at C–17α are anabolic agents having a favorable anabolic-androgenic ratio; those having an alkenyl or alkinyl group at C–17α are potent progestational hormones.

The following general formulas illustrate the new compounds which are the object of the present invention:

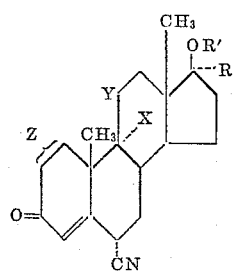

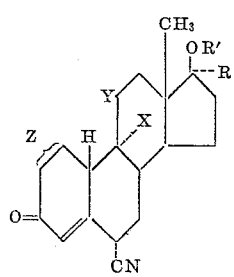

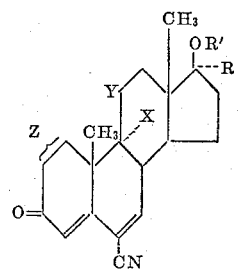

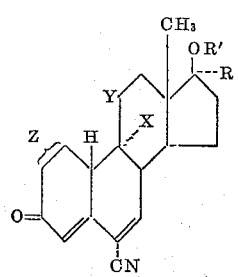

In these formulas, X is a member of the group consisting of hydrogen and fluorine, Y is a structural arrangement selected from the group consisting of

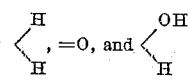

Z is a carbon-to-carbon linkage selected from the group consisting of C—C and C=C; R is a member of the group consisting of hydrogen, lower alkyl, lower alkenyl and lower alkinyl radicals, and R' is a member of the group consisting of hydrogen and acyl radicals derived from hydrocarbon carboxylic acids having up to about 12 carbon atoms.

R comprises lower alkyl radicals such as methyl, ethyl, propyl, isopropyl, the several isomers of butyl and the like up to radicals having about 7 to 8 carbon atoms; it further comprises alkenyl radicals such as vinyl, propenyl, and alkinyl radicals such as ethinyl, propinyl and butinyl.

R', when acyl, is derived from hydrocarbon carboxylic acids the molecules of which are saturated or unsaturated, of straight, branched, cyclcic or mixed aliphatic-cyclic chain, and optionally substituted with functional groups such as hydroxyl, acyloxy (of 1 to 12 carbon atoms), alkoxy (formed with lower alkphatic alcohols of 1 to 5 carbon atoms, aromatic alcohols or mixed aliphatic-aromatic alcohols) or halogen such as fluorine or chlorine; typical esters of such acids are, among others, the acetate, propionate, iso-butyrate, hemisuccinate, enanthate, caproate, benzoate, trimethylacetate, phenoxyacetate, phenylpropionate, cyclopentylpropionate and β-chloropropionate.

For preparing the new compounds according to the present invention, we use a process which is illustrated in the following Reaction Diagram I and shall be described in more detail thereafter:

REACTION DIAGRAM I

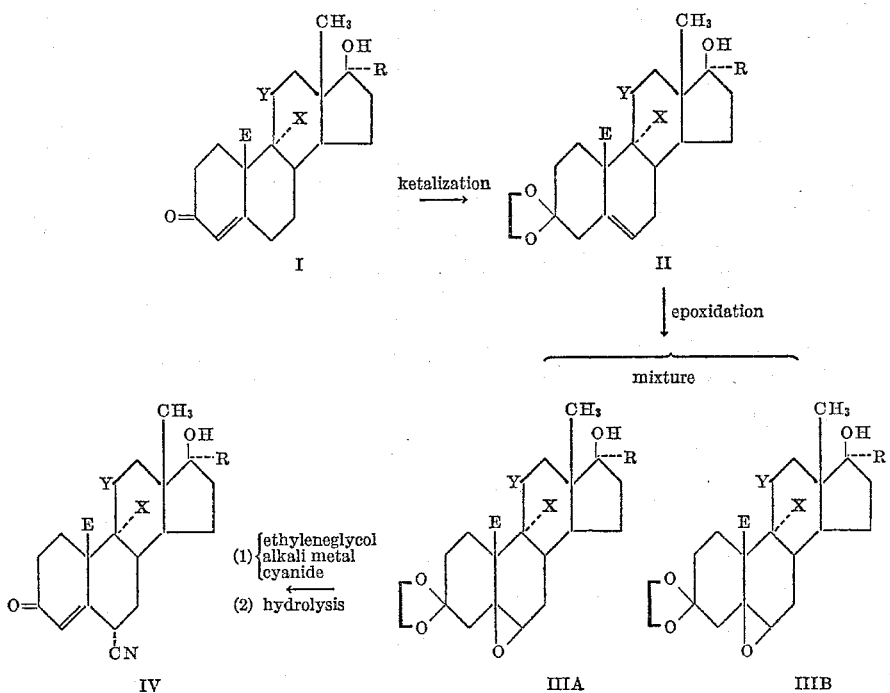

In the above formulas R, X and Y have the same meaning as explained hereinbefore, and E is a member of the group consisting of hydrogen and methyl.

According to the above-illustrated process a known $\Delta^4$-3-ketone of the androstane series and having the general Formula I is first ketalized at C–3 to the corresponding 3-ketal (II) and the latter is then converted into its 3-alkylenedioxy-5α,6α-oxido derivative (IIIA) and then separated by conventional methods from the accompanying stereoisomer (IIIB). By refluxing the intermediate (IIIA) with an excess of potassium cyanide in mixture with ethyleneglycol there is obtained a mixture of the 6-cyano-3-alkylenedioxy-$\Delta^5$-derivative and of the 6-cyano-3-(hydroxy-alkoxy)-$\Delta^{3,5}$-derivative, which mixture is then subjected to an acid treatment, preferably by refluxing with dilute sulfuric acid in methanol solution. Thereby the 6α-cyano-$\Delta^4$-3-ketone of general Formula IV is obtained in mixture with its enolic tautomer.

In the 6α-cyano-$\Delta^4$-3-ketones of the androstane series we further introduced additional double bonds at one or both of the positions C–1 and C–6 by process steps illustrated in the following Reaction Diagram II:

REACTION DIAGRAM II

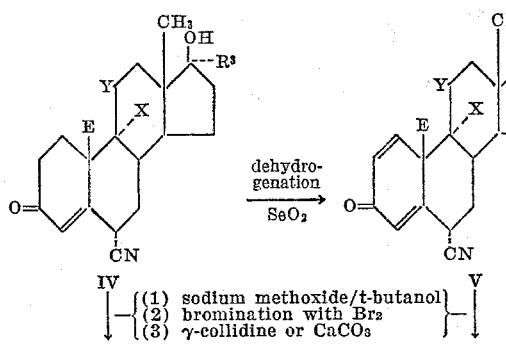

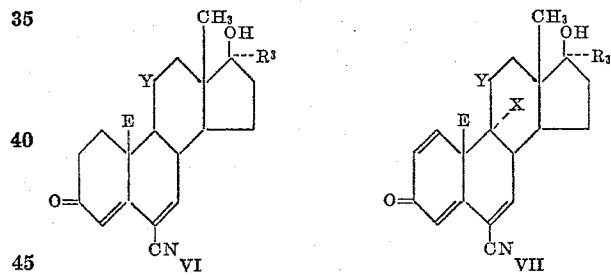

By refluxing compound IV with selenium dioxide in mixture with t-butanol, in the presence of catalytic amounts of pyridine and under an atmosphere of nitrogen we obtain the $\Delta^{1,4}$-3-ketones of general Formula V. In order to introduce a double bond at C–6, we treat the $\Delta^4$-3-ketones (IV) or the $\Delta^{1,4}$-3-ketones (V) first in t-butanol solution with 1.1 molar equivalents of sodium methoxide, which reaction produces the 6-cyano-6-sodio compound; the latter is reacted directly, without prior isolation, with 1.1 molar equivalents of bromine; thus we obtain a 6-cyano-6-bromo compound which is dehydrobrominated by refluxing with γ-collidine or by reaction with calcium carbonate. The resulting 6-cyano-4,6-dienes and the 6-cyano-1,4,6-trienes are represented by Formulas VI and VII respectively.

We further esterified the 17β-hydroxyl group of the above-mentioned compounds IV by methods commonly employed for this operation, which can be illustrated by the following equation:

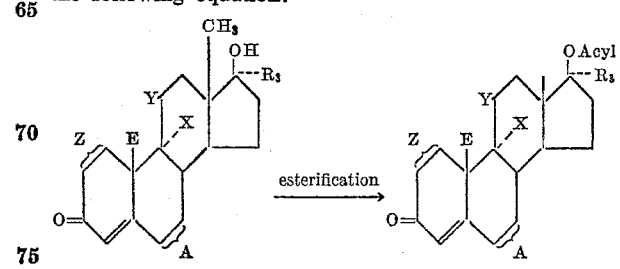

in which E, R, X, Y and Z have the same meaning as explained hereinbefore. A is selected from the group consisting of

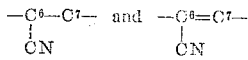

The aforementioned reactions can be modified within wide limits without altering the result of the process. To name some of the possible modifications: the potassium cyanide may be substituted by another source of cyanide ions, such as for example sodium cyanide, and/or the ethyleneglycol may be substituted by another solvent inert to this reaction, preferably having a similar boiling point as ethyleneglycol; the mixture of compounds obtained by the reaction with the cyanide in ethyleneglycol may be separated by chromatography and the separate components may each be treated with dry hydrogen chloride; this acid may be replaced by another acid, and the reaction may also be effected with dry hydrogen chloride in acetic acid solution; the hydroxyl group of the 6α-cyano compounds may be esterified before effecting the dehydrogenation at C–1 and in this case there is obtained the 17-ester of the respective 1-dehydro compound; the dehydrogenation at C–1 may also be carried out by microbiological methods, for example by incubation with *Corynebacterium simplex* ATCC 6946.

Furthermore, the 6-dehydro-17α-alkenyl compounds can be obtained by partial catalytic hydrogenation of the alkinyl group of the 6-cyano-alkinyl compounds, in pyridine solution and in the presence of palladium on calcium carbonate as a catalyst.

Our invention will be further illustrated but not limited in scope by a number of examples:

Example 1

A mixture of 6 g. of testosterone, 120 cc. of dry benzene, 45 cc. of ethyleneglycol distilled over sodium hydroxide and 800 mg. of p-toluenesulfonic acid monohydrate was refluxed for 12 hours with the use of a water separator; the cooled mixture was treated with aqueous saturated sodium bicarbonate solution, and the organic layer was separated, washed with water, dried over anhydrous sodium sulfate, filtered, and the solvent was evaporated under reduced pressure. The residue was purified by chromatography on neutral alumina, thus yielding 3-ethylenedioxy-$\Delta^5$-androsten-17β-ol.

A cooled solution of 5 g. of the above ketal in 100 cc. of chloroform was treated with an ether solution of monoperphthalic acid containing 1.2 molar equivalents of the reagent and the mixture was kept at room temperature in the dark for 24 hours; the mixture was then diluted with water, and the organic layer was separated, washed with water, dried over anhydrous sodium sulfate and the solvent was evaporated under reduced pressure. The residue consisted of a mixture of 3-ethylenedioxy-5α,6α-oxido-antrostan-17β-ol and 3-ethylenedioxy-5β,6β-oxido-androstan-17β-ol, wherefrom the 5α,6α isomer was isolated by chromatography on neutral alumina.

A mixture of 5 g. of 3-ethylenedioxy-5α,6α-oxido-androstan-17β-ol (3 - cycloethyleneketal-5α,6α-epoxide of testosterone), 10 g. of potassium cyanide and 200 cc. of ethyleneglycol was refluxed for 1 hour, poured into ice water and the precipitate was collected, thus giving a mixture of the 3-hydroxyethyl ether of 6-cyano-$\Delta^{3,5}$-androstadiene 3,17β-diol and of 6-cyano-3-ethylenedioxy-$\Delta^5$-androsten-17β-ol. The precipitate was washed with water, air dried, mixed with 250 cc. of methanol and 25 cc. of 8% (v./v.) sulfuric acid and refluxed for 30 minutes. The cooled mixture was diluted with 250 cc. of water, the methanol was distilled under reduced pressure and the mixture was neutralized with saturated aqueous sodium bicarbonate solution; the product was extracted with methylene chloride and the extract was washed with water, dried over anhydrous sodium sulfate and evaporated to dryness. Crystallization of the residue from acetone-hexane afforded 6-cyano-testosterone.

Example 2

A solution of 5 g. of $\Delta^{9(11)}$-dehydro-testosterone ($\Delta^{4,9(11)}$-androstadiene-17β-ol-3-one) [described by F. W. Heyl et al. in JACS 77, 488 (1955)], in 50 cc. of pure dioxane containing 8 cc. of 0.4 normal perchloric acid was treated at room temperature in the absence of light with 2.5 g. of N-bromo-acetamide which was added under stirring in the course of one hour; the mixture was stirred for another hour and treated with 10% sodium sulfite solution until the test with starch-potassium iodide paper failed to give a blue color; 75 cc. of chloroform were then added, the resulting organic layer separated and successively washed with water, sodium bicarbonate solution and again with water, then dried over anhydrous sodium sulfate and the solvent evaporated to dryness under vacuum. Trituration of the residue with ether yielded 9α-bromo-$\Delta^4$-androstene-11β,17β-diol-3-one.

A solution of 4 g. of the aforesaid compound in 20 cc. of pure dioxane was slowly added to a mixture of 2 g. of potassium acetate in 40 cc. of absolute ethanol, which had been previously heated to the boiling point. The mixture was refluxed for 45 minutes, cooled and diluted with water and the precipitate collected by filtration, washed with water and dried, thus giving the 9β,11β-oxido-$\Delta^4$-androstene-17β-ol-3-one.

In a polyethylene flask, fitted with a magnetic stirrer, 2 g. of compound III was dissolved in 40 cc. of pure chloroform, the solution was cooled to 0° C. and mixed in the course of 20 minutes, while stirring, with 0.4 g. of anhydrous hydrogen fluoride. The mixture was stirred for 2 hours at 0° C. and then neutralized by cautious addition of aqueous sodium bicarbonate, the reaction mixture was transferred to a separatory funnel, washed with water, dried over anhydrous sodium sulfate, and concentrated under reduced pressure until precipitation; the mixture was cooled and the precipitate collected; after recrystallization from acetone-hexane, 9α-fluoro-11β-hydroxy-testosterone is obtained.

The latter compound was further treated as described in Example 1 and there were obtained 3-ethylenedioxy-9α-fluoro-$\Delta^5$-androstene-11β,17β-diol; 3-ethylenedioxy-5α,6α-oxido- and 3-ethylenedioxy-5β,6β-oxido-9α-fluoro-androstane-11β,17β-diols; the 3-hydroxyethyl ether of 6-cyano-9α-fluoro-$\Delta^{3,5}$-androstadiene-3,11β,17β-triol and 6-cyano - 3 - ethylenedioxy - 9α - fluoro - $\Delta^5$ - androstene-11β,17β-diol, and finally 6α-cyano-9α-fluoro-11β-hydroxy-testosterone.

Example 3

The following solutions "A," "B" and "C" were prepared using distilled water as solvent: solution "A" was prepared by mixing 425 cc. of a 1.742% dipotassium hydrogen phosphate solution ($K_2HPO_4$) with 75 cc. of 1.38% monosodium dihydrogen phosphate; solution "B" was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution "C" was prepared by dissolving 20.9 g. of fumaric acid and 14.4 g. of sodium hydroxide in 1 lt. of water and diluting the solution to 1.2 lt. Then 475 cc. of solution "A," 4.32 lt. of solution "B" and 1.2 lt. of solution "C" were mixed.

The fat was removed from the adrenal glands obtained from recently slaughtered oxen and the glands were ground in a meat grinder until an homogeneous mass was obtained; 3 kg. of this mass were then added to 6 lt. of the mixture of solution "A," "B" and "C," obtained as described above, and the mixture was vigorously stirred.

There was then added 3 g. of 17α-ethinyl testosterone in 16 cc. of propylene glycol and the mixture was stirred again at a temperature of 28–37° C. for 3 hours. 40 lt. of acetone was then added and the stirring was continued for one hour further at room temperature.

The solid was removed by filtration and washed twice with 10 lt. fractions of acetone; the washings were combined with the filtrate and concentrated under reduced pressure below 30° C. to a volume of approximately 5 lt. The aqueous residue was washed three times with 4 lt. portions of hexane and the hexane was discarded. The aqueous residue was then extracted with 2 portions of 3 lt. of methylene dichloride, the extract was washed with water, dried over anhydrous sodium sulfate, and concentrated to a volume of approximately 300 cc., under vacuum and below room temperature.

The concentrated solution was allowed to pass through a column prepared with a mixture of 90 g. of silica and 90 g. of celite. The column was washed with 3 lt. of methylene dichloride and then with a mixture of 900 cc. of methylene dichloride and 100 of acetone. The product was then eluted with mixtures of methylene dichloride and acetone (80:20 and 70:30). The solvents from these elutions was evaporated and the residue crystallized from ethyl acetate. There was thus obtained 17α-ethinyl-11β-hydroxy-testosterone.

The latter compound was then further treated as described in Example 1, and there were obtained the 3-ethylenedioxy derivative, a mixture of the 3-ethylenedioxy-5α,6α-oxido and the 3-ethylenedioxy-5β,6β-oxido derivatives, the 3-hydroxy ethyl ether of the 6-cyano-Δ³,⁵-androstadiene compound and the 6-cyano-3-ethylenedioxy-Δ⁵-androstene compound derived from 17α-ethinyl-11β-hydroxytestosterone, and finally 6α-cyano-17α-ethinyl-11β-hydroxytestosterone.

*Example 4*

500 mg. of 11β-hydroxy-19-nor-testosterone, described in United States Patent 2,655,518, were mixed with 5 cc. of pyridine and 2 cc. of acetic anhydride and allowed to stand at room temperature for 4 hours. The mixture was then poured into ice water and filtered, the precipitate was washed with water and recrystallized from acetone-hexane thus giving the acetate of 11β-hydroxy-nor-testosterone.

300 mg. of the above product were dissolved in 5 cc. of acetic acid and treated with a solution of 72 mg. of chromic acid (1.2 mol equivalents) in 3 cc. of 80% acetic acid, the reaction mixture let stand at room temperature for 1 hour, poured into ice water, the precipitate was collected and washed with water until neutral. After crystallization from acetone-ether, 11-keto-nor-testosterone acetate was obtained. This compound (210 mg.) was dissolved in 10 cc. of methanol, and a solution of 70 mg. of sodium hydroxide in methanol (2 cc.) was added and the reaction mixture let stand under nitrogen for 1 hour at room temperature, after this time it was neutralized with a few drops of acetic acid, and the solution concentrated to one-third its volume under reduced pressure, poured into ice water, the precipitate was filtered thus giving the free 11-keto-19-nor-testosterone.

Further processing of the latter compound by the method described in Example 1 leads ultimately to 6α-cyano-11-keto-19-nor-testosterone.

*Example 5*

1 g. of 9α-fluoro-11-keto-testosterone described in "Recent Progress in Hormone Research," vol. XIV (1958), and U.S. Patent 2,678,933, was dissolved in 20 cc. of acetic acid and treated at room temperature with a solution of 240 mg. (1.2 mol equivalents) of chromic acid in 5 cc. of 80% acetic acid; the reaction mixture let stand at room temperature for 1 hour, poured into ice water, the precipitate collected, washed with water until neutral and recrystallized from methylene in chloride-ether, thus yielding 9α-fluoro adrenosterone.

A suspension of 1 g. of the above compound in 10 cc. of peroxide-free dioxane and 2 cc. of freshly distilled ethyl orthoformate was treated with 30 mg. of p-toluenesulfonic acid monohydrate and the reaction mixture stirred at room temperature for 4.5 minutes (the solid came into solution within 20 minutes). After this time, the resulting yellow solution was treated with 0.8 cc. of pyridine and poured into ice water; after filtration of the precipitate and recrystallization from methanol-water, the 3 enol ether of 9α-fluoro-adrenosterone was obtained.

Into a solution of 800 mg. of 9α-fluoro-adrenosterone in 80 cc. of 3:2 benzene-anhydrous ether was passed a slow stream of acetylene for 1 hour. With continued stirring, a solution of 0.8 g. of potassium in 35 cc. of purified tert-amyl alcohol was added rapidly and the stream of acetylene continued for 3 hours more. After this time, the system was flushed with nitrogen, the reaction mixture diluted with benzene and treated cautiously with 200 cc. of saturated aqueous ammonium chloride. The organic layer was separated and the aqueous phase was reextracted three times with benzene, the combined extracts were washed with saturated ammonium chloride solution and water; dried over anhydrous sodium sulfate and evaporated to dryness with vacuo; the crude enol ether was dissolved in 50 cc. of methanol, 5 cc. of 0.25 N hydrochloric acid added and the faintly turbid suspension let stand at room temperature overnight, poured into ice water and the precipitate collected. Recrystallization from methylene chloride-ether (after decolorization with charcoal) yielded the pure 9α-fluoro-11-keto-17α-ethinyl-testosterone.

The latter compound was treated by the method described in Example 1 and there was ultimately obtained 6α-cyano-9α-fluoro-11-keto-17α-ethinyl testosterone.

A solution of 500 mg. of the last mentioned compound in 15 cc. of pyridine was shaken in hydrogen with 0.2 g. of a 5% palladium-on-calcium carbonate catalyst at atmospheric pressure and room temperature; after 1 mol of gas had been absorbed and the uptake had become slow, the catalyst was removed, the solvent was evaporated in vacuo and the residue was dissolved in ethyl acetate. Washing with dilute hydrochloric acid, sodium bicarbonate and water, drying with anhydrous sodium sulfate and finally crystallization from ethyl acetate furnished 6α-cyano-9α-fluoro-11-keto-17α-vinyl-testosterone, λ max. 238 mu, log E 4.12.

*Examples 6–33*

The method of the preceding examples was applied to prepare first the 3-ethylenedioxy-5α,6α-oxido derivatives of the testosterone analogs cited in Table I below used as starting materials, and there was obtained the respective 6α-cyano-Δ⁴-3-ketones listed in the same table:

TABLE I

| Example No. | Starting Material | Source of Starting Compound | 6α-cyano product |
|---|---|---|---|
| 6 | 17α-methyl-testosterone. | well known and conventional. | 6α-cyano-17α-methyl-testosterone. |
| 7 | 17α-ethyl-testosterone. | ____do____ | 6α-cyano-17α-ethyl-testosterone. |
| 8 | 17α-vinyl-testosterone. | ____do____ | 6α-cyano-17α-vinyl-testosterone. |
| 9 | 17α-ethinyl-testosterone. | ____do____ | 6α-cyano-17α-ethinyl-testosterone. |
| 10 | 17α-propin-(1)-yl-testosterone. | prepared with the aid of propine-(1) by the method described by Ruzicka et al., Helv. Chim. Acta 20, 1280 (1937). | 6α-cyano-17α-propin-(1)-yl-testosterone. |
| 11 | 11β-hydroxytestosterone. | Fried et al., J.A.C.S. 74, 3692 (1952). | 6α-cyano-11β-hydroxy-testosterone. |
| 12 | 19-nor-testosterone. | well known and conventional. | 6α-cyano-19-nor-testosterone. |
| 13 | 17α-methyl-11-keto-testosterone. | J. Biol. Chem. 228, 339 (1957), U.S. Patent 2,678,933. | 6α-cyano-17α-methyl-11-keto-testosterone. |

TABLE I—Continued

| Example No. | Starting Material | Source of Starting Compound | 6α-cyano product |
|---|---|---|---|
| 14 | 9α-fluoro-11-keto-testosterone. | Recent Progress in Hormone Research, vol. XIV (1958), U.S. Patent 2,793,218. | 6α-cyano-9α-fluoro-11-keto-testosterone. |
| 15 | 17α-methyl-9-fluoro-11β-hydroxy-testosterone. | U.S. Patent 2,793,218 and Herr et al., JACS 78, 500 (1956). | 6α-cyano-17α-methyl-9α-fluoro-11β-hydroxy-testosterone. |
| 16 | 11-keto-testosterone. | Mancera et al., JACS 75, 2189 (1953). | 6α-cyano-11-keto-testosterone. |
| 17 | 9α-fluoro-17α-methyl-11-keto-testosterone. | U.S. Patent 2,793,218. | 6α-cyano-9α-fluoro-17α-methyl-11-keto-testosterone. |
| 18 | 11-keto-17α-methyl-19-nor-testosterone. | U.S. Patent 2,678,933. | 6α-cyano-11-keto-17α-methyl-19-nor-testosterone. |
| 19 | 11β-hydroxy-19-nor-testosterone. | U.S. Patent 2,655,518. | 6α-cyano-11β-hydroxy-19-nor-testosterone. |
| 20 | 11β-hydroxy-17α-methyl-19-nor-testosterone. | U.S. Patent 2,686,792. | 6α-cyano-11β-hydroxy-17α-methyl-19-nor-testosterone. |
| 21 | 11β-hydroxy-17α-vinyl-19-nor-testosterone. | U.S. Patent 2,702,811. | 6α-cyano-11β-hydroxy-17α-vinyl-19-nor-testosterone. |
| 22 | 11β-hydroxy-17α-thinyl-19-nor-testosterone. | U.S. Patent 2,702,811. | 6α-cyano-11β-hydroxy-17α-ethinyl-19-nor-testosterone. |
| 23 | 9α-fluoro-11-keto-19-nor-testosterone. | U.S. Patent 2,838,503. | 6α-cyano-9α-fluoro-11-keto-19-nor-testosterone. |
| 24 | 9α-fluoro-11β-hydroxy-19-nor-testosterone. | U.S. Patent 2,838,503. | 6α-cyano-9α-fluoro-11β-hydroxy-19-nor-testosterone. |
| 25 | 9α-fluoro-11β-hydroxy-17α-methyl-19-nor-testosterone. | U.S. Patent 2,793,218. | 6α-cyano-9α-fluoro-11β-hydroxy-17α-methyl-19-nor-testosterone. |
| 26 | 9α-fluoro-11-keto-17α-methyl-19-nor-testosterone. | U.S. Patent 2,838,503. | 6α-cyano-9α-fluoro-11-keto-17α-methyl-19-nor-testosterone. |
| 27 | 9α-fluoro-11β-hydroxy-17α-vinyl-19-nor-testosterone. | U.S. Patent 2,836,607. | 6α-cyano-9α-fluoro-11β-hydroxy-17α-vinyl-19-nor-testosterone. |
| 28 | 17α-vinyl-11-keto-19-nor-testosterone. | prepared from 11β-hydroxy-19-nor-testosterone by the methods of Examples 4, 5 and 6. | 6α-cyano-17α-vinyl-11-keto-19-nor-testosterone. |
| 29 | 17α-ethinyl-11-keto-19-nor-testosterone. | prepared from 11β-hydroxy-19-nor-testosterone by the methods of Examples 4 and 5. | 6α-cyano-17α-ethinyl-11-keto-19-nor-testosterone. |
| 30 | 17α-methyl-19-nor-testosterone. | Djerassi et al., J.A.C.S. 76, 4092 (1954). | 6α-cyano-17α-methyl-19-nor-testosterone. |
| 31 | 17α-ethinyl-19-nor-testosterone. | Djerassi et al., ibidem. | 6α-cyano-17α-ethinyl-19-nor-testosterone. |
| 32 | 17α-vinyl-19-nor-testosterone. | Djerassi et al., J.A.C.S. 77, 148 (1955). | 6α-cyano-17α-vinyl-17α-ethinyl-19-nor-testosterone. |

Example 33

A mixture of 3 g. of 6α-cyano-testosterone prepared as described in Example 1, 250 cc. of t-butanol, 1.6 g. of selenium dioxide (recently sublimed) and a few drops of pyridine was refluxed under an atmosphere of nitrogen for 48 hours and filtered through celite; the filtrate was evaporated to dryness, the residue was dissolved in acetone, treated with decolorizing charcoal, refluxed for 1 hour, filtered and the acetone was evaporated. Chromatography of the residue on neutral alumina yielded 6α-cyano-$\Delta^{1,4}$-androstadien-17β-ol-3-one.

Example 34

The method of dehydrogenation of the preceding example was applied to the 6α-cyano-derivatives of (a) 17α-methyl-testosterone, (b) 17α-propyl-testosterone, (c) 17α-vinyl-testosterone, (d) 17α-propinyl-testosterone, (e) 11-keto-testosterone, and (f) 17α-methyl-11β-hydroxy-testosterone; there were thus obtained the respective 6α-cyano-$\Delta^{1,4}$-3-ketones, namely: (a) 6α-cyano-17α-methyl-$\Delta^{1,4}$-androstadien-17β-ol-3-one; (b) 6α-cyano-17α-propyl-$\Delta^{1,4}$-androstadien-17β-ol-3-one; (c) 6α-cyano-17α-vinyl-$\Delta^{1,4}$-androstadien-17β-ol-3-one; (d) 6α-cyano-17α-propinyl-$\Delta^{1,4}$-androstadien-17β-ol-3-one; (e) 6α-cyano-$\Delta^{1,4}$-androstadien-17β-ol-3,11-dione; and (f) 6α-cyano-17α-methyl-$\Delta^{1,4}$-androstadien-11β,17β-diol-3-one.

Example 35

A solution of 4 g. of 6α-cyano-testosterone prepared as described in Example I, in 120 cc. of t-butanol was added to 1.1 molar equivalents of sodium methoxide, prepared by removing the solvent from a methanol solution of the corresponding amount of sodium metal; the mixture was stirred at room temperature for half an hour and then there was slowly added under stirring a solution of 1.1 molar equivalents of bromine in t-butanol, while maintaining the temperature at around 15° C. The mixture was kept for half an hour at room temperature, diluted with water and the precipitate was collected by filtration, washed with water and dried under vacuum. The product, namely the crude 6-cyano-6-bromo-testosterone, was used for the next step without further purification.

A solution of the above compound in 20 cc. of dimethylformamide was added to a hot suspension of 1.5 g. of calcium carbonate in dimethyl-formamide and the mixture was refluxed for 15 minutes, concentrated to about 20 cc., cooled and poured into aqueous saturated sodium chloride solution; the precipitate was collected, washed with water, dried and recrystallized from acetone-hexane. There was thus obtained 6-cyano-6-dehydro-testosterone.

Example 36

A mixture of 2 g. of 6-cyano-6-bromo-testosterone, the intermediate obtained in the preceding example, and 50 cc. of γ-collidine was refluxed for 1 hour, cooled, diluted with ether and the precipitate of collidine hydrobromide was removed by filtration; the filtrate was washed with dilute hydrochloric acid, then with aqueous saturated sodium bicarbonate solution and finally with water, dried over anhydrous sodium sulfate and the ether was evaporated. The residue crystallized from acetone-hexane to produce 6-cyano-6-dehydro-testosterone, identical with the final product of the preceding example.

Example 37

In accordance with the method described in Examples 35 and 36, there was introduced an additional double bond at C-6 of (a) 6α-cyano-1-dehydro-testosterone, (b) 6α-cyano-17α-ethinyl-testosterone, (c) 6α-cyano-11-keto-testosterone, (d) 17α-methyl-6α-cyano-11β-hydroxy-1-dehydro-testosterone and in (e) 6α-cyano-17α-methyl-9α-fluoro-11β-hydroxy-testosterone and (f) 17α-methyl-6α-cyano-testosterone. The resulting products were:

(a) 6-cyano-1,6-bis-dehydro-testosterone (6α-cyano-$\Delta^{1,4,6}$-androstatrien-17β-ol-3-one).
(b) 6-cyano-17α-ethinyl-6-dehydro-testosterone.
(c) 6-cyano-11-keto-6-dehydro-testosterone.
(d) 6-cyano-17α-methyl-11β-hydroxy-1,6-bis-dehydro-testosterone.
(e) 6-cyano-17α-methyl-9α-fluoro-11β-hydroxy-6-dehydro-testosterone.
(f) 6-cyano-17α-methyl-6-dehydro-testosterone.

Example 38

A mixture of 1 g. of 6α-cyano-testosterone prepared as described in Example 1, 5 cc. of pyridine and 1 cc. of acetic anhydride was kept overnight at room temperature and then poured into water and heated on the steam bath for half an hour; after cooling, the precipitate was collected, washed with water, dried and recrystallized from acetone-hexane. There was thus obtained the acetate of 6α-cyano-testosterone.

*Example 39*

There was prepared 6-cyano-1,6-bis-dehydro-testosterone by introducing a double bond at C-6 of 6α-cyano-1-dehydro-testosterone, in accordance with Example 37(a); 1 g. of this triene was treated with 5 cc. of pyridine and 2 cc. of propionic anhydride and kept overnight at room temperature; the reaction mixture was poured into water and the precipitate was collected, washed with water, dried and recrystallized from acetone-hexane, thus furnishing the propionate of 6-cyano-1,6-bis-dehydro-testosterone.

*Example 40*

A mixture of 1 g. of 6α-cyano-17α-methyl-11-keto-testosterone prepared as described in Example 13, 25 cc. of acetic anhydride and 5 g. of acetyl chloride was refluxed under an atmosphere of nitrogen for 2 hours. The solvent was removed by distillation under reduced pressure, avoiding overheating, and the residue was treated with 50 cc. of 1% methanolic potassium hydroxide solution and stirred under an atmosphere of nitrogen at 0° C. for 1 hour. The mixture was acidified with acetic acid, concentrated to about 10 cc. poured into cold aqueous sodium chloride solution; the precipitate was collected, washed with water, dried and recrystallized from acetone-hexane. There was thus obtained the 17-acetate of 6α-cyano-17α-methyl-11-keto-testosterone.

*Example 41*

A solution of 1 g. of 17α-ethinyl-6α-cyano-19-nor-6-dehydrotestosterone prepared by the method described in Example 35 from the end product of Example 32, in 100 cc. of benzene was treated with 3 cc. of benzoyl chloride and 150 mg. of p-toluenesulfonic acid monohydrate, stirred for 48 hours at room temperature and diluted with water; the benzene layer was separated, washed with 5% aqueous sodium carbonate solution and then with water to neutral, dried over anhydrous sodium sulfate, the benzene was evaporated and the residue crystallized from acetone-hexane. There was thus obtained the benzoate of 17α-ethinyl-6-cyano-19-nor-6-dehydro-testosterone.

*Example 42*

A mixture of 1 g. of 6α-cyano-9α-fluoro-11β-hydroxy-testosterone, prepared as described in Example 2, 5 cc. of pyridine and 3 cc. of cyclopentylpropionic anhydride was kept at room temperature for 48 hours, poured into water, heated for 2 hours on the steam bath, cooled and the precipitate was collected, washed with water, dried and recrystallized from acetone-hexane. There was thus obtained the 17β-cyclopentylpropionate of 6α-cyano-9α-fluoro-11β-hydroxy-testosterone.

*Example 43*

To a suspension of 150 mg. of pre-reduced 10% palladium on calcium carbonate in 20 cc. of pyridine was added 600 mg. of 6-cyano-17α-ethinyl-6-dehydro-testosterone prepared as described in Example 37(b) and the mixture was hydrogenated at room temperature until the equivalent of approximately 1 molar equivalent of hydrogen had been absorbed. The catalyst was filtered and the pyridine was evaporated under reduced pressure. The residue was crystallized from acetone-hexane to obtain 6-cyano-17α-vinyl-6-dehydro-testosterone.

By acetylation, in accordance with the method described in Example 38, there was then obtained the acetate of 6-cyano-17α-vinyl-6-dehydro-testosterone.

We claim:
1. A member of the group consisting of the new compounds corresponding to the general formulas

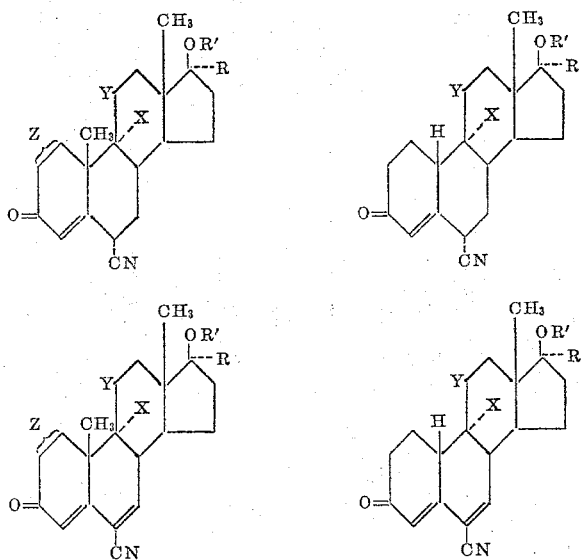

in which X is a member of the group consisting of hydrogen and fluorine, Y is selected from the group consisting of

Z is a carbon-to-carbon linkage selected from the group consisting of C—C and C=C, R is a member of the group consisting of hydrogen, lower alkyl, lower alkenyl and lower alkinyl, and $R^1$ is a member of the group consisting of hydrogen and the acyl radical of a hydrocarbon carboxylic acid having up to about 12 carbon atoms.

2. A compound as described in claim 1, in which R is lower alkyl.

3. A compound as described in claim 1, in which R is methyl.

4. A compound as described in claim 1, in which R is lower alkenyl.

5. A compound as described in claim 1, in which R is vinyl.

6. A compound as described in claim 1, in which R is alkinyl.

7. A compound as described in claim 1, in which R is ethinyl.

8. A compound as described in claim 1, in which X is fluorine and Y is =O.

9. A compound as described in claim 1, in which X is fluorine and Y is

10. A compound as described in claim 1, in which Y is =O.

11. A compound as described in claim 1, in which Y is

OH
/
\H

12. A compound as described in claim 1 in which R' is the acyl radical of a hydrocarbon carboxylic acid having up to about 12 carbon atoms.

13. 6α-cyano-testosterone.

14. 6α-cyano-1-dehydro-testosterone.
15. 6-cyano-6-dehydro-testosterone.
16. 6-cyano-1,6-bis-dehydro-testosterone.
17. 6α-cyano-19-nor-testosterone.
18. 6α-cyano-17α-(lower alkyl)-19-nor-testosterone.
19. 6α-cyano-17α-(lower alkenyl)-19-nor-testosterone.
20. 6α-cyano-17α-(lower alkinyl)-19-nor-testosterone.

References Cited in the file of this patent
UNITED STATES PATENTS 2,837,464    Nobile _____ June 3, 1958

OTHER REFERENCES

Sanchez et al.: "Journal of American Chemical Society" (1959), vol. 81, pages 5233–5242 relied on.